May 19, 1964
R. J. KOPF
3,133,287
EXPLOSIVELY-ACTUATED TOOLS WITH CAPTIVE
FASTENING UNITS THEREFOR
Filed Aug. 17, 1954
3 Sheets-Sheet 1
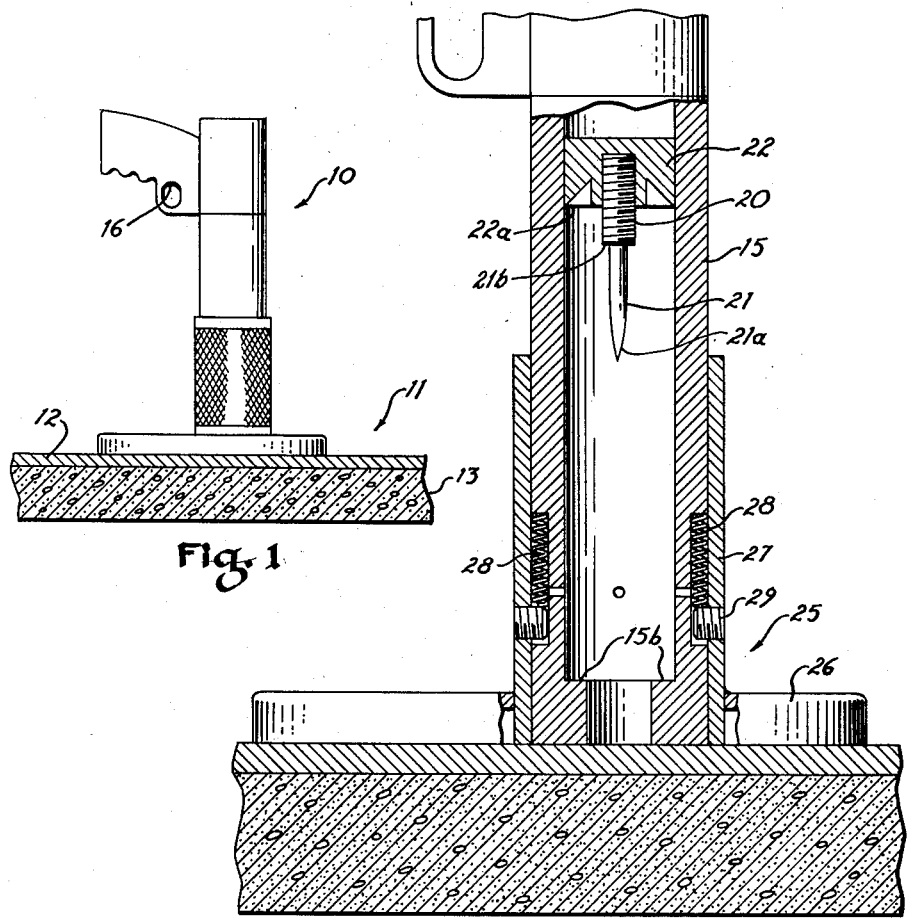
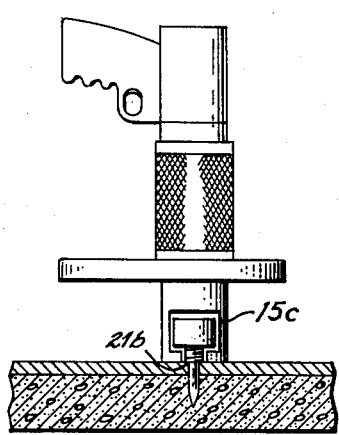
INVENTOR.
Rowland J. Kopf
BY
Hyde, Meyer, Baldwin & Doran
ATTORNEYS

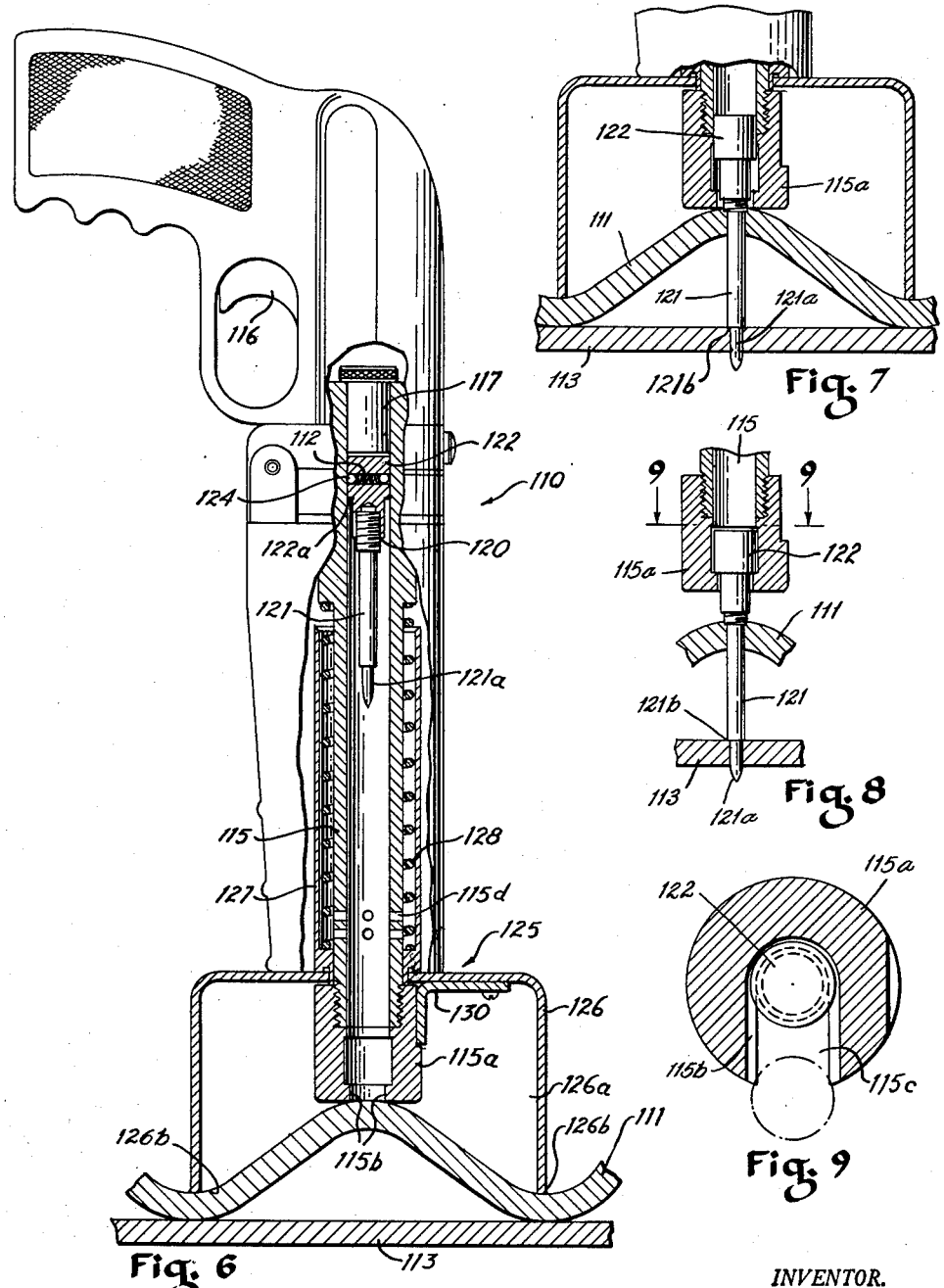

INVENTOR.
ROWLAND J. KOPF
BY
John D. Wilkins
ATTORNEY

United States Patent Office 3,133,287
Patented May 19, 1964

3,133,287
EXPLOSIVELY-ACTUATED TOOLS WITH CAPTIVE FASTENING UNITS THEREFOR
Rowland J. Kopf, Rocky River, Ohio, assignor, by mesne assignments, to Olin Mathieson Chemical Corporation, a corporation of Virginia
Filed Aug. 17, 1954, Ser. No. 450,476
18 Claims. (Cl. 1—44.5)

This invention relates to improvements in explosively-actuated tools and more particularly, to an explosively-actuated tool having a captive fastening unit.

One of the objects of the present invention is to provide an explosively-actuated tool wherein the fastener driven thereby cannot escape into free flight.

A further object of the present invention is to provide an explosively-actuated tool for guiding a fastener into a workpiece wherein the fastener is captive within the tool while it is being driven but in which means are provided for detachment from the tool of at least the piercing portion of the fastener after driving thereof with the fastener remaining firmly embedded in the workpiece.

A further object of the present invention is to provide an explosively-actuated tool having a side port in its barrel for removal of a driven fastener and having a cover for exposing or covering this port whenever desired.

A further object of the present invention is to provide an explosively-actuated tool wherein the aforementioned cover takes the form of a flash shield on the tool barrel muzzle.

A further object of the present invention is to provide an explosively-actuated tool characterized by its greater safety in operation, more satisfactory driving of fasteners thereby, structural simplicity, and ease of operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a side elevational view of an explosively-actuated tool pressed against a workpiece in a ready-to-fire position;

FIG. 2 is a longitudinal sectional view through the barrel of the tool in FIG. 1;

FIG. 3 is a side elevational view similar to FIG. 1, after an explosive charge has driven the piercing point of a fastener into the workpiece to its normal depth and the combined flash shield and port cover is retracted from the workpiece;

FIG. 4 is a side elevational view, partially in section, of the fastening unit after removal from the tool through the open side port; while FIG. 5 is a side elevational view, partially in section, of a fastener set in the workpiece as it appears after the fastener carrier piston or ram has been unscrewed therefrom;

FIG. 6 is a side elevational view, partially in longitudinal section, of a modified form of tool and fastening unit in a position corresponding to FIG. 2;

FIG. 7 is a partial side elevational view, partially in section, with a fastening unit driven to its normal depth by the FIG. 6 tool so that this view corresponds with FIG. 3;

Figure 10:
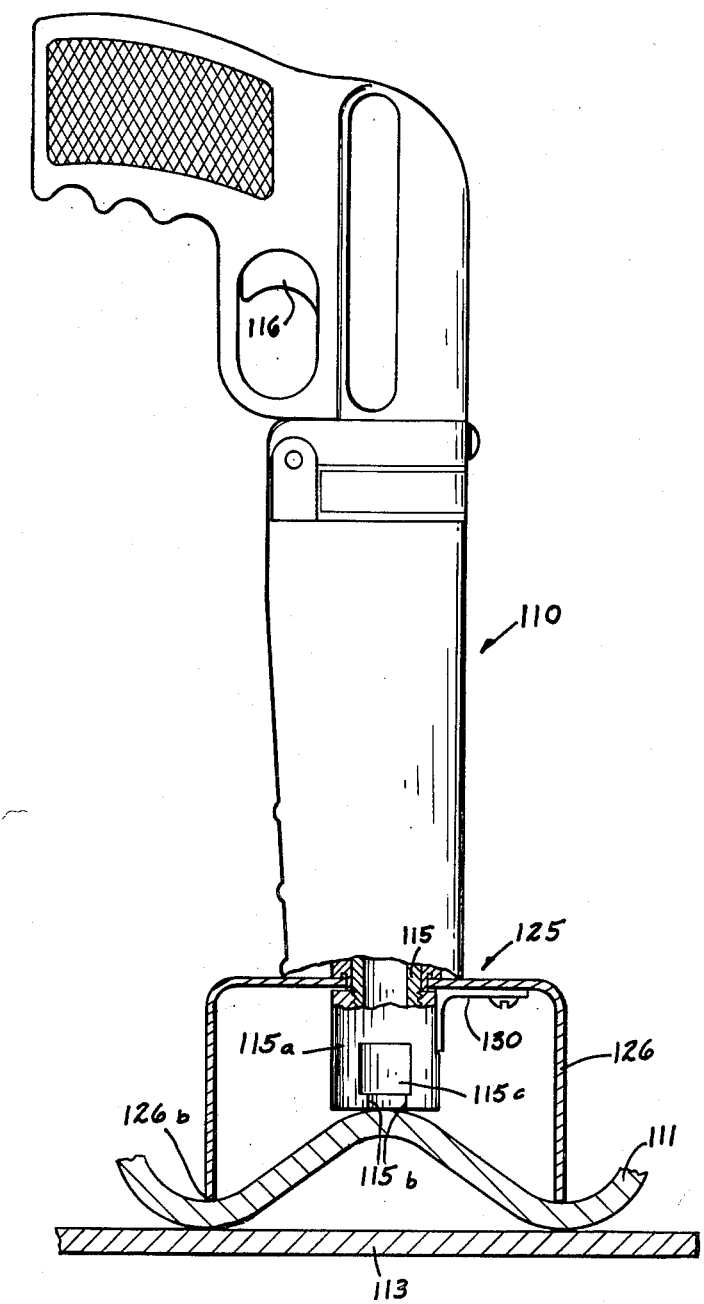

FIG. 8 is a longitudinal sectional view, corresponding to FIG. 7, after the tool has been partially retracted or removed from the workpiece so that the fastening unit laterally aligns with the port in the barrel for removal from the tool; while FIG. 9 is a horizontal, enlarged sectional view taken along the line 9—9 of FIG. 8 showing the fastening unit in the barrel muzzle attachment in the solid line position and partially removed through the side port in the dot-dash line position; and FIG. 10 is a side-elevational view partly in section showing the side port at the lower end of the barrel.

Before the tool here illustrated is specifically described, it is to be understood that the invention here involved is not limited to the structural details or arrangement of parts here shown, since tools embodying the present invention may take various forms. It also is to be understood that the phraseology or terminology herein employed is for purposes of description and not of limitation, since the scope of the present invention is denoted by the appended claims.

Those familiar with this art will recognize that while my invention may be applied in many ways, I have chosen to illustrate the same in connection with explosively-actuated tools. The tool 10 in FIGS. 1 to 3 inclusive is shown for driving or setting a fastener into the flat surface of a workpiece 11 comprising a covering 12 to be secured to a base portion 13, and tool 110 in FIGS. 6 to 9 inclusive is shown for driving a fastener into workpiece 111 comprising a corrugated roofing or siding covering of steel or cement asbestos material to be secured to a base portion 113 forming the girt or purlin.

The explosively-actuated tool 10 or 110 respectively include a barrel 15 or 115 so that an explosive charge set off by trigger 16 or 116 can drive the fastening unit through the barrel toward the barrel muzzle and through the workpiece 11 or 111. The fastening unit and explosive charge, the latter being shown at 117 in FIG. 6, are loaded from the breech of the barrel in the present disclosure, but may be loaded in any other suitable manner, such as from the muzzle. An example of an explosively-actuated tool on which the present invention may be used is disclosed in a copending U.S. patent application of Robert W. Henning, Roger Marsh and myself, now U.S. Patent No. 2,945,236 granted July 19, 1960, to which reference may be had for further disclosure if necessary. In a conventional explosively-actuated tool, the fastener is driven through the barrel and out of the muzzle at high speed, so that if the tool barrel is not properly set against the workpiece or if the fastener is fired into unsuitable material, the fastener may escape into the air in free flight so as to become dangerous. It is therefore desirable for safety reasons to prevent the escape of the fastener into free flight. This difficulty may occur when using a conventional tool if the operator attempts to fire the tool into the air instead of against the workpiece, if the operator attempts to fire the tool into a workpiece having insufficient penetration resistance so that the fastener travels completely through the workpiece to escape into free flight, if the operator fires the tool with the barrel axis substantially less than 90° with respect to the surface of the workpiece so that a ricochet occurs, etc. The present invention has solved these, as well as many other problems by having a fastening unit, including the fastener as well as a captive ram or fastener carrier piston, driven through the tool barrel by the explosively actuating gases with this ram prevented by appropriate means from escaping completely from the barrel. Hence, the fastener cannot escape into free flight, but the safety features of the present invention are not required under normal conditions when there is no danger of the fastener escaping into free flight.

In the present disclosure, the tool 10 or 110 has respectively a captive fastening unit 20 or 120 with each unit including fastener 21 or 121 connected by screw threads to a fastener carrier piston or captive ram 22 or 122. The fastener has piercing portions 21a or 121a for penetrating the workpiece while the pistons have abutment means or shoulder 22a or 122a to be described in further detail hereinafter. The ram or piston 22 or 122 is shown as being internally threaded to accept the fastener, but in the event the fastener has an internally threaded head, the ram or piston may be externally threaded to engage the fastener. It will also be apparent as the description proceeds, that the tool will work in basically the same manner if the fastener can be designed with an outline having the shape of the whole fastening unit so that the fastening unit is one member with the ram or piston portion being integrally a part of the driven fastener so that a separate ram or piston is not required.

During tool loading, the piston 22 or 122 is screwed onto the thread of fastener 21 or 121 so as to form the fastening unit 20 or 120 and then this unit is inserted into the breech of the tool barrel 15 or 115. Then, the explosive charge, inserted in a breech plug shown at 117 in FIG. 6, is also inserted into the breech as a separate unit after which the breech of the tool is closed so that the tool can be moved to firing positon against the workpiece 11 and 111. It will also be apparent hereinafter that the tool could be loaded from the muzzle instead of the breech, if so desired. After trigger 16 or 116 is pulled, the fastener 21 or 121 is driven into the workpiece to its normal and desired penetration shown in FIGS. 3 or 7 wherein the shoulder 21b or 121b limits the penetration thereof.

The fastening unit may be held in the barrel bore in any suitable manner before the tool is fired so as to control the size of the initial explosive charge chamber and to properly drive the fastener. This takes the form of a friction retaining device to hold the fastener carrier piston against axial downward movement under only the weight of the fastening unit. In FIG. 2, this takes the form of friction between the piston 22 and the bore of the barrel 15. In FIG. 6, this takes the form of a resilient friction means on the piston 122 disclosed as a pair of balls 124, 124 outwardly biased against the barrel bore by a coil spring 112 in a diametrical hole of the piston 122. The opposite ends of this hole may be slightly peened over if desired to retain the balls and spring therein when the fastener carrier piston 122 is removed from the barrel bore.

However, if the tool is fired so that there is a possibility of having the fastener escape into free flight, the safety feature prevents this normal occurrence when the fastening unit travels outwardly through the barrel substantially beyond the FIG. 3 or FIG. 7 position. Tool barrel 15 or 115 has a uniform bore diameter throughout most of its length of a size to permit free passage of the fastening unit 20 or 120 therethrough with no excess clearance or slop. However, this diameter is abruptly reduced at or near the muzzle to a dimension sufficient to arrest the forward travel of the piston or ram while permitting free passage of the piercing portion 21a or 121a of the fastener for workpiece penetration. Hence, this reduced barrel bore diameter forms an abutment means capable of coacting with the abutment means 22a or 122a on the piston or ram to prevent further axial travel of the fastening unit through the barrel and thus to prevent the free escape of the fastening units from the tool. Hence, the fastening unit is stopped as its piercing portion 21a or 121a emerges a predetermined distance from the barrel muzzle so as to control the penetration of the workpiece or travel beyond the muzzle independently of the resistance to penetration of the workpiece material or of the explosive driving force. In the tool form in FIG. 2, this abutment means takes the form of an inwardly directed flange 15b integrally formed with the remainder of the barrel and located at the barrel muzzle. In FIG. 6, the barrel 115 includes a threaded barrel cap 115a screwed onto the remainder of the barrel and forming the muzzle thereof with this barrel cap having an inwardly directed flange 115b to similarly form this abutment means.

This construction provides greater safety in tool operation as well as more satisfactory setting of the fasteners. It prevents the free escape of a fastener. The tool operator cannot dangerously send the fastener into free flight by firing the tool into the air instead of against the workpiece. If the workpiece does not have sufficient resistance to penetration, there exists neither the danger that the fastener will emerge from the other side of the workpiece in free flight nor the danger that the fastener will be overdriven beyond the depth control established by the engagement of the abutment means on the fastening unit and the barrel muzzle. Substantial inclination of the barrel bore from the normal to the workpiece surface will not cause a ricochet since the fastener cannot escape into free flight.

When the fastener is driven either to the normal penetration position of FIG. 3 or 7 or is driven beyond this point until the abutment means engage, the fastening unit 20 or 120 can be removed from the bore of the tool while the fastener remains embedded in the workpiece. Both the fastener 21 or 121 and the fastener carrier piston or captive ram 22 or 122 are easily disengaged as a unit from the tool after firing. A transverse opening or side port 15c in the one-piece barrel 15 or port 115c in the barrel cap 115a leads laterally from the barrel bore immediately above the shelf formed by the flange 15b or 115b to the outside of the barrel. Each side port generally T-shape in cross section (see FIG. 3 for example) with the cross bar of the T being the widest part of the port and equal at least to the diameter of the barrel bore with the cross bar of the T located above flange 15b or 115b and the stem of the T extending downwardly therefrom in the driving direction and being wider than the piercing portion, serves as a means for detaching the tool from the driven fastening unit after the fastening unit has stopped traveling through the barrel bore. When the fastening unit has been driven sufficiently far so that the abutment means engage to provide the safety function, the captive ram of piston 22 or 122 is laterally aligned with the port so that the tool is easily removed by lateral movement thereof. However, when the fastener piercing portion is only driven to its normal penetration depth in FIG. 7 the tool barrel must be moved upwardly away from the workpiece until the tool barrel reaches the FIG. 8 position so as to align the captive ram or piston 122 with the side port for lateral removal of the tool therefrom by having the fastening unit first in the solid line position in FIG. 9 with respect to the tool and then in the dot-dash line position as it emerges from the port. When the tool has been removed from the fastening unit, the latter then has the appearance shown in FIG. 4. Then, the piston may be unscrewed for re-use and the remaining driven fastener is shown in FIG. 5.

Each tool, 10 or 110, is provided with a cover for effectively closing the port during firing by at least screening it off. The cover also acts as a flash shield and telescopically connected to the barrel for laterally closing the side port during tool firing and is retractable from the workpiece to expose the port for fastening unit removal. Since the flash shield must be positively engaged with the workpiece to provide suitable protection during tool firing, the flash shield is mounted on the barrel for relative movement with respect thereto, and is normally biased by resilient means away from the barrel breech to provide the positive engagement with the workpiece.

In FIG. 2, the flash shield is shown at 25 and includes a shield portion 26 and a sleeve 27 fixedly connected together and telescoped over the barrel. The periphery of the barrel has axially extending slots on diametrically opposite sides thereof with each slot having a spring 28 therein as well as the inner ends of a screw 29 screwed into and carried by the sleeve 27. The outer portion of the sleeve 27 may be knurled, if desired, so that the operator can grip the knurling by one hand and move the sleeve 27 axially relative to the barrel against the bias of springs 28 from the port covering position in FIG. 2 to the port uncovering position in FIG. 3 for uncovering said port 15c for lateral removal of the fastening unit therethrough.

In FIG. 6, the flash shield is shown generally at 125 and includes an interconnected shield portion 126 and sleeve 127 telescoped over the barrel 115 and biased away from the barrel breech by the coil spring 128 over the barrel. The flash shield side wall portion 126 has a recess 126a, within a voluminous enclosure generally of inverted U-shape in cross section, extending upwardly in FIG. 6 from its workpiece engaging lower edge and back toward the tool breech. The lower edge 126b of the shield in FIG. 6 surrounds the axis of the barrel, is shaped to conform with the corrugations, and makes contact along the full length in the FIG. 6 position with corrugated siding forming the workpiece 111 so that said siding closes the only open side of said voluminous recess 126a. The side port 115c is in communication with this recess 126a formed by shield portion 126. Hence, the flash shield, while pressed against the workpiece, effectively covers the port 115c in the FIG. 6 position during tool firing but when the tool 110 is retracted from the workpiece 111, the tool barrel moves upwardly to the FIG. 8 position and then the tool may be moved laterally so that the fastening unit 120 moves out into this recess. Then, axial movement of the tool away from the workpiece 111 will completely remove the tool from the fastening unit 120.

It should be noted that the complementary shape of flash shield edge 126b to the corrugations also aligns the tool with the corrugations so that the fastener will be accurately driven into the crown of one of said corrugations.

Since the barrel muzzle cap 115a in FIG. 6 is free to rotate by the threaded connection with respect to the remainder of the barrel, it is desirable to add keying means to prevent relative rotation between the cap and the remainder of the barrel so that the port 115c always faces in the same direction on the tool. Then, the tool can always be withdrawn in the same direction from the fastening unit with little difficulty even though the port and fastening units are all hidden below the shield portion 126. This keying means takes the form of a generally L-shape strap 130 in FIG. 6 having its horizontal leg welded or otherwise secured to the inner surface of the shield portion 126 while its vertical leg has a flat engaging with a coacting flat on the surface of the cap 115a with the flat on the cap being of sufficient length to permit relative movement of the shield portion 126 with respect to the barrel 115 during tool movement. The sleeve 127, barrel 115, and the surrounding housing of the tool are suitably keyed together by non-circular surfaces, such as are disclosed in the said copending application or in any other suitable manner, to prevent relative rotation therebetween. If this keying means were not provided, the tool operator would have to use the cut and try method to determine the direction of tool movement required to detach it from the fastening unit.

The ease of use of the tool illustrated in FIG. 6 should be readily apparent. The shield portion 126 coacting with the workpiece covers the side port to prevent any danger therefrom during tool firing. However, when the tool is removed from the workpiece, the recess 126a in the flash shield has adequate width to permit removal of the tool from the fastening unit at the same time. It is not necessary for the tool operator to move separately the port cover to an uncovering position, such as shown in FIG. 3.

In both FIGS. 2 and 6, the fastener is shown as being screwed into the piston or captive ram to the full thread depth. However, it is possible to manually adjust the position wherein the safety feature on each of the tools takes effect. The screw threaded connection on each fastening unit between the fastener 21 or 121 and the ram 22 or 122 not only provides a detachable connection therebetween but also provides axial adjustment of the distance between the abutment means 22 or 122a and piercing portion on each fastening unit since the screw thread axis extends in the axial direction of the barrel. The tool operator can pre-set this distance by adjusting the screw thread engagement before the fastening unit is inserted into the tool breech.

Gas ports are also desirable on the tool barrel in the present construction since the fastener cannot escape into free flight. These gas ports, such as the gas ports 115d in FIG. 6, not only reduce the likelihood of high and dangerous pressures developing in the tool barrel, but also impinge the gas into tubing 127 and internally against the shield structure so as to minimize tool lift. During firing, there is always the tendency for the tool to be lifted up off the workpiece by the expanding pressure of the gas in the barrel bore tending to move the tool from the FIG. 7 to the FIG. 8 position since the abutment means do not engage in the FIG. 7 position. In FIG. 2, the vented gas impinges in the barrel slots against the rearwardly facing surface of screws 29 carried by shield sleeve 27 for the same purpose.

Various changes in details and arrangement of parts can be made by one skilled in the art without departing from either the spirit of this invention or the scope of the appended claims.

What is claimed is:

1. A drivable unit adapted to be driven by a fluid pressure through a tool barrel bore toward the muzzle thereof, said unit comprising a piston and means thereon for detachable connection to a workpiece penetrating fastener and for carrying said fastener through the barrel bore, said piston having resilient means for resiliently engaging the barrel bore to hold said piston and attached fastener with predetermined yieldability against axial movement to any selected position in said bore under only the weight of the unit, said piston and bore opposite said muzzle constituting a variable fluid presure chamber so as to control the initial size of said fluid pressure chamber behind said piston.

2. A drivable unit adapted to be driven by a fluid pressure through a tool barrel bore toward the muzzle thereof, said unit comprising a piston including a threaded front extension for detachable connection to a matingly threaded workpiece penetrating fastener and for carrying said fastener through the barrel bore, said piston having resilient means comprising uniformly circumferentially spaced spring loaded balls for resiliently engaging the barrel bore substantially evenly to hold said piston and attached fastener with predetermined yieldability against axial movement to any selected position in said bore under only the weight of the unit, said piston and bore opposite said muzzle constituting a variable fluid pressure chamber so as to control the initial size of said fluid pressure chamber behind said piston.

3. An explosively actuated tool for a fastening unit adapted to be driven into a workpiece thereby and wherein said fastening unit includes a threaded fastener having a piercing portion for penetrating the workpiece with said fastener detachably connected to the mating threads of a reduced front extension of a fastener carrier piston including an enlargement defining with said extension an abutment, said tool including said piston and a barrel so that an explosive charge can drive said fastening unit through said barrel toward the barrel muzzle, said piston having resilient means taking the form of spring loaded balls for resiliently engaging the barrel bore to hold said piston and attached fastener with predetermined yieldability against axial movement to any selected position in said bore under only the weight of the fastening unit, said piston and bore opposite said muzzle constituting a variable fluid pressure chamber so as to control the initial size of said explosive charge chamber behind said piston, abutment means on said tool for engaging the piston abutment of said fastening unit to stop the axial travel of said fastening unit through said barrel as the piercing portion of said fastening unit emerges a predetermined distance from the muzzle of said barrel, and means for permitting detachment of at least the tool exclusive of the piston from at least the piercing portion of said fastening unit after stopping of said fastening unit.

4. A fluid pressure actuated tool for driving a workpiece piercing portion of a drivable unit into a workpiece, comprising a barrel having a bore formed with a muzzle end, fluid pressure generating explosive cartridge chambering means at the barrel breech for applying said pressure in said bore for driving said unit through said bore toward the barrel muzzle end, an abutment means carried on said tool forming an extension of said bore and projecting partially over said muzzle end for stopping the axial travel of said unit through said barrel bore extension as the piercing portion of said unit emerges a predetermined distance from the barrel muzzle and beyond said abutment means so as to permit workpiece penetration, said abutment means and said barrel being operatively connected together to prevent relative movement therebetween during operation of said tool, and a side port in said abutment means extending outwardly from said extension of the barrel bore and communicating therewith for permitting detachment of said tool from the entire drivable unit by passage of the rest of said unit through said port after stopping of said unit without disengagement of said piercing portion from the workpiece.

5. The tool of claim 4 wherein the abutment means carried on the tool is formed integral with the barrel and wherein the tool includes a flash shield telescopically mounted on the barrel adjacent the muzzle end, said shield forming a cover for movement along said barrel between port covering and uncovering positions thereby slidably closing the side port during driving.

6. The tool of claim 5 including resilient means normally biasing said flash shield into the port covering position and against the workpiece.

7. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, abutment means operatively connected to said barrel at said discharge end being operable to engage with said arrestable portion of said driving piston and thus stop the travel of said unit through said bore with the fastener being located in a driven position with said piercing portion thereof extending a predetermined distance beyond said discharge end of said barrel, said abutment means having a port communicating with said bore at its discharge end for permitting lateral movement of said barrel effective to thus remove said barrel from said driving piston, and a flash shield operatively connected to said barrel being shieldably disposed around said discharge end of said barrel and defining a chamber communicating with said port into which said driving piston is receivable in response to said lateral movement of said barrel.

8. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, abutment means operatively connected to said barrel at said discharge end being operable to engage with said arrestable portion of said driving piston and thus stop the travel of said unit through said bore with the fastener being located in a driven position with said piercing portion thereof extending a predetermined distance beyond said discharge end of said barrel, said abutment means having a port communicating with said bore at its discharge end for permitting lateral movement of said barrel effective to thus remove said barrel from said driving piston, a flash shield telescopically connected to said barrel, resilient means normally biasing said flash shield forwardly of and to a shieldable position with the discharge end of said barrel, and said shield defining a chamber communicating with said port into which said driving piston and said fastener are receivable in response to said lateral movement of said barrel.

9. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, abutment means carried on said barrel and extending partially over said discharge end of said bore and in position to engage with said arrestable portion of said driving piston and thus stop the travel of said unit through said bore with the fastener being located in a driven position with said piercing portion thereof extending a predetermined distance beyond said discharge end of said barrel, said abutment means having a port communicating with said bore at its discharge end for permitting lateral movement of said barrel effective to thus remove said barrel from said driving piston, and a flash shield operatively connected to said barrel being shieldably disposed around said discharge end of said barrel and defining a chamber communicating with said port into which said driving piston is receivable in response to said lateral movement of said barrel.

10. A power actuated tool as defined in claim 9 and wherein the port in said abutment means is T-shaped in section and extends laterally through said abutment means relative to said barrel.

11. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, abutment means operatively connected to said barrel at said discharge end being operable to engage with said arrestable portion of said driving piston and thus stop the travel of said unit through said bore with the fastener being located in a driven position with said piercing portion thereof extending a predetermined distance beyond said discharge end of said barrel, said abutment means having a port communicating with said bore at its discharge end, said port extending outwardly from the axis of said bore for permitting lateral movement of said barrel effective to thus remove said barrel from said driving piston, and a flash shield operatively connected to said barrel being shieldably disposed around said discharge end of said barrel and defining a chamber communicating with said port into which said driving piston is receivable in response to said lateral movement of said barrel.

12. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, a cap member carried on said barrel being formed with flange means extending partially over said discharge end of said bore and in position to engage with said arrestable portion of said driving piston to thus stop the travel of said unit through said bore with the fastener being located in a driven position with said piercing portion thereof extending a predetermined distance beyond said discharge end of said barrel, said cap member having a port communicating with said bore at its discharge end for permitting lateral movement of said barrel effective to thus remove said barrel from said driving piston, and a flash shield operatively connected to said barrel being shieldably disposed around said discharge end of said barrel and defining a chamber communicating with said port into which said driving piston is receivable in response to said lateral movement of said barrel.

13. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, a cap member threadedly mounted on said barrel being formed with flange means extending partially over said discharge end of said bore and in position to engage with said arrestable portion of said driving piston to thus stop the travel of said unit through said bore with the fastener being located in a driven position with said piercing portion thereof extending a predetermined distance beyond said discharge end of said barrel, said cap member having a port communicating with said bore at its discharge end and extending laterally through said cap member relative to said barrel, said port having a portion which has a width transversely of said barrel at least equal to the diameter of said bore to thus slidably accommodate said driving piston, said one portion of said port permitting lateral movement of said barrel effective to thus remove said barrel from said driving piston, and a flash shield operatively connected to said barrel being shieldably disposed around said discharge end of said barrel and defining a chamber communicating with said port into which said driving piston is receivable in response to said lateral movement of said barrel.

14. A power actuated tool comprising a barrel formed with a bore having a discharge end and through which is driven a drivable unit, said drivable unit including a driving piston having an arrestable portion, said unit being adapted to drive a fastener having a forwardly projecting piercing portion through said bore for penetrating a workpiece, a cap member threadedly mounted on said barrel being formed with flange means extending partially over said discharge end of said bore and in position to engage with said arrestable portion of said driving piston to thus stop the travel of said unit through said bore with the fastener being located in a driven position with said piercing portion thereof extending a predetermined distance beyond said discharge end of said barrel, said flange means forming a bore coaxial with said barrel bore communicating with the latter and of such diameter as to slidably accommodate said piercing portion of said fastener, said cap member having a port connecting with said communicating bore and extending laterally through said cap member relative to said barrel, said port having a portion which has a width transversely of said barrel at least equal to the diameter of said barrel bore to thus slidably accommodate said driving piston, said one portion of said port permitting lateral movement of said barrel effective to thus remove said barrel from said driving piston, and a flash shield operatively connected to said barrel being shieldably disposed around said discharge end of said barrel and defining a chamber communicating with said port into which said driving piston is receivable in response to said lateral movement of said barrel.

15. A fluid explosion pressure actuated tool for driving a workpiece piercing detachable portion of a drivable unit into said workpiece, comprising a driving piston portion of said unit, a barrel for driving by said pressure said unit through the barrel bore toward the barrel muzzle to a normal depth position of said piercing portion, a shield structure mounted for slidable movement along the length of said barrel toward and away from a forward operating safety position adjacent said muzzle and having a part extending transversely outwardly therefrom and a rearwardly facing surface, and an abutment means on said barrel as a second safety device over said muzzle for not only limiting the forward movement of said shield with respect to said safety position but also for stopping the axial travel of said unit through said barrel at a point beyond said normal depth position whereat said unit strikes said abutment means in the event of overdriving of said unit as the piercing portion of said unit emerges a predetermined distance from the barrel muzzle and beyond said abutment means so as to permit only normal workpiece penetration, said barrel having fluid flow ports therein locating rearwardly with reference to said safety position and back of a fluid pressure driving surface on said piston when driven forwardly to accomplish said normal depth position, whereby fluid pressure is released against said surface after said portion is driven at said normal depth position to press forwardly against said shield structure and tool lift from recoil thereby is resisted during driving before said unit has engaged the abutment means to further resist lift or overdriving.

16. An explosive operated tool for projecting an interconnected driving piston and a fastener device at high velocity against a work surface, said tool comprising a barrel, a chamber in said barrel in which an explosive cartridge may be fired, a driving piston in said barrel and directly acted upon by explosion gases released from a fired cartridge, means resistant to both tension and compression forces acting to interconnect said driving piston and a fastener device, whereby the assembled piston and the fastener are directly accelerated to high velocity by explosion gases, safety means cooperating with said barrel to maintain said interconnected driving piston and fastener device operatively connected with said barrel after they have been projected by operation of the tool, and cooperating means on said safety means and said driving piston to permit manual release of said projected driving piston and interconnected fastener from said barrel without requiring disassembly of said safety means from said tool.

17. An explosive operated tool for projecting fastener devices at high velocities into a work surface, said tool comprising a barrel, a chamber in said barrel in which an explosive cartridge may be fired, a driving piston in said barrel and directly acted upon by explosion gases released from a fired cartridge, manually releasable means resistant to both tension and compression forces acting to interconnect said driving piston and a fastener device, whereby the assembled piston and fastener device are accelerated to high velocities by explosive forces, safety means cooperating with said barrel to form a movement limiting connection between said barrel means and said driving piston during and after projection of the driving piston and the interconnected fastener device by the explosive forces, cooperating means on said safety means and said driving piston to permit manual manipulation of said tool relative to said projected piston and interconnected fastener device to release said driving piston from the barrel after firing of a cartridge without requiring disassembly of said safety means from said tool, whereupon said manually releasable means may be operated to release said driving piston from said projected fastener device.

18. An explosive operated tool for projecting fastener devices at high velocities into a work surface, said tool comprising a barrel, a chamber in said barrel in which an explosive cartridge may be fired, a driving piston in said barrel and directly acted upon by explosion gases released by the firing of a cartridge, threaded means interconnecting said driving piston and a fastener device whereby the interconnected driving piston and fastener device may together be directly accelerated by explosive forces, safety means mounted in prolongation of said barrel to intercept said driving piston and limit the movement thereof during and after projection of the fastener device, cooperating means on said driving piston and said safety means to permit manual release of said driving piston from the safety means without requiring disassembly of said safety means from said tool whereby said tool may be removed from the driven interconnected fastener and driving piston and the driving piston may be unscrewed from said fastener.

(References on following page)

References Cited in the file of this patent

UNITED STATES PATENTS

| | | |
|---|---|---|
| 1,365,870 | Temple | Jan. 18, 1921 |
| 1,466,968 | Smith | Sept. 4, 1923 |
| 1,500,253 | Miller | July 8, 1924 |
| 1,798,664 | Friedman | Mar. 31, 1931 |
| 1,945,377 | Posnack | Jan. 30, 1934 |
| 1,958,739 | Bliss | May 15, 1934 |
| 2,064,503 | Temple | Dec. 15, 1936 |
| 2,213,435 | Temple | Sept. 3, 1940 |
| 2,221,157 | Temple | Nov. 12, 1940 |
| 2,637,241 | Weber | May 5, 1953 |
| 2,660,726 | Weingart | Dec. 1, 1953 |
| 2,666,252 | Temple | Jan. 19, 1954 |
| 2,666,915 | Erickson | Jan. 26, 1954 |
| 2,676,508 | Erickson | Apr. 27, 1954 |
| 2,687,572 | Matthews | Aug. 31, 1954 |
| 2,722,004 | Webber et al. | Nov. 1, 1955 |
| 2,767,398 | Pfaff et al. | Oct. 23, 1956 |

FOREIGN PATENTS

| | | |
|---|---|---|
| 178,075 | Austria | Apr. 10, 1954 |
| 509,655 | Belgium | Mar. 31, 1952 |
| 768,859 | France | May 28, 1934 |
| 1,055,269 | France | Oct. 14, 1953 |
| 1,062,649 | France | Dec. 9, 1953 |
| 729,824 | Great Britain | May 11, 1955 |
| 744,822 | Great Britain | Feb. 15, 1956 |